Oct. 19, 1937.  H. R. SCHUTZ  2,096,264
TAKE-OUT DEVICE
Filed Feb. 21, 1936  3 Sheets—Sheet 2
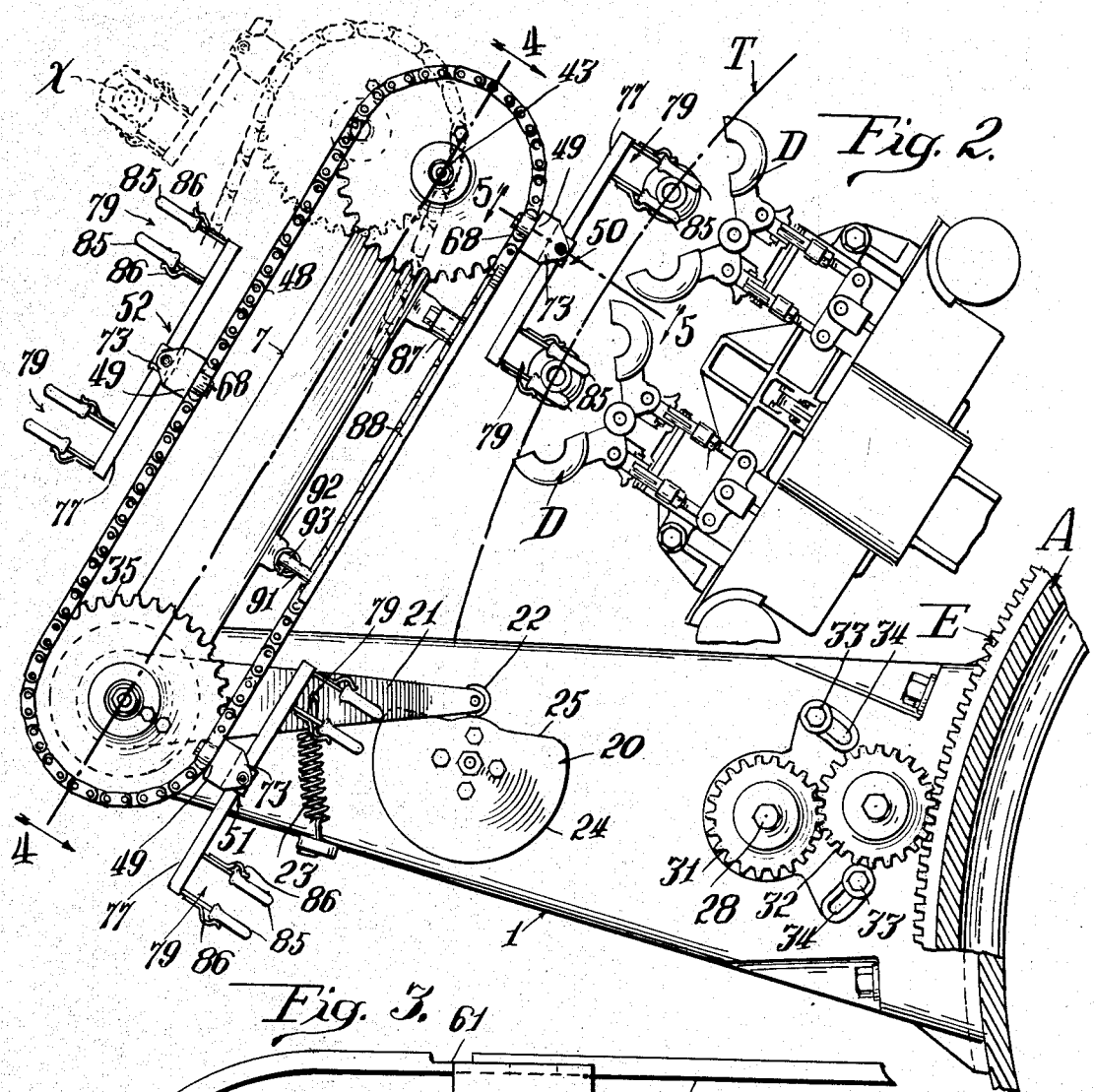
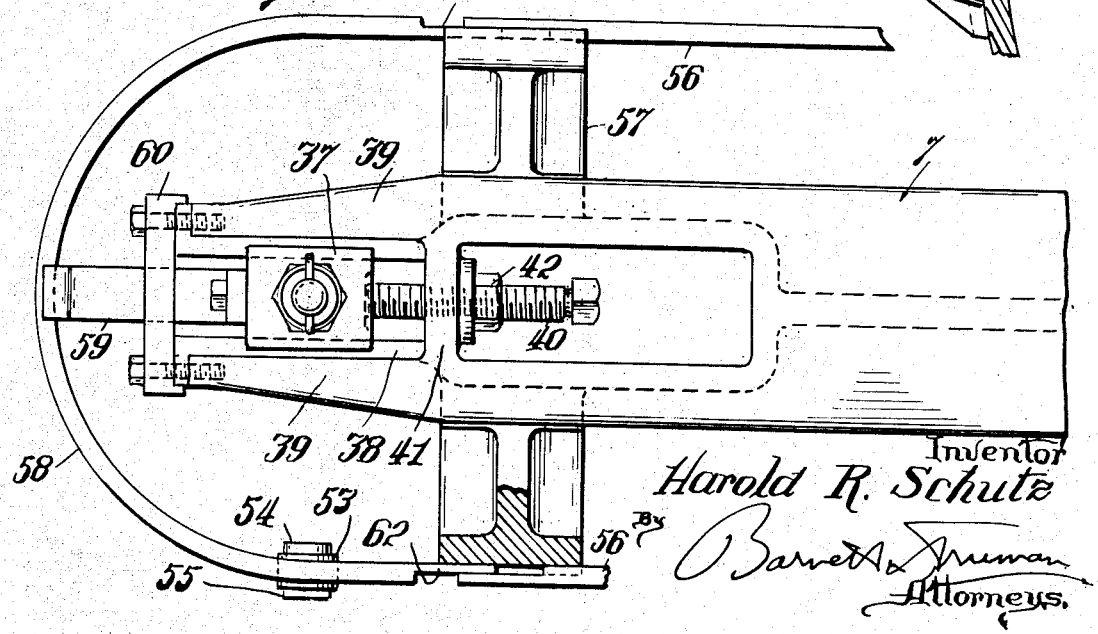
Inventor
Harold R. Schutz
By Barrett & Truman
Attorneys.

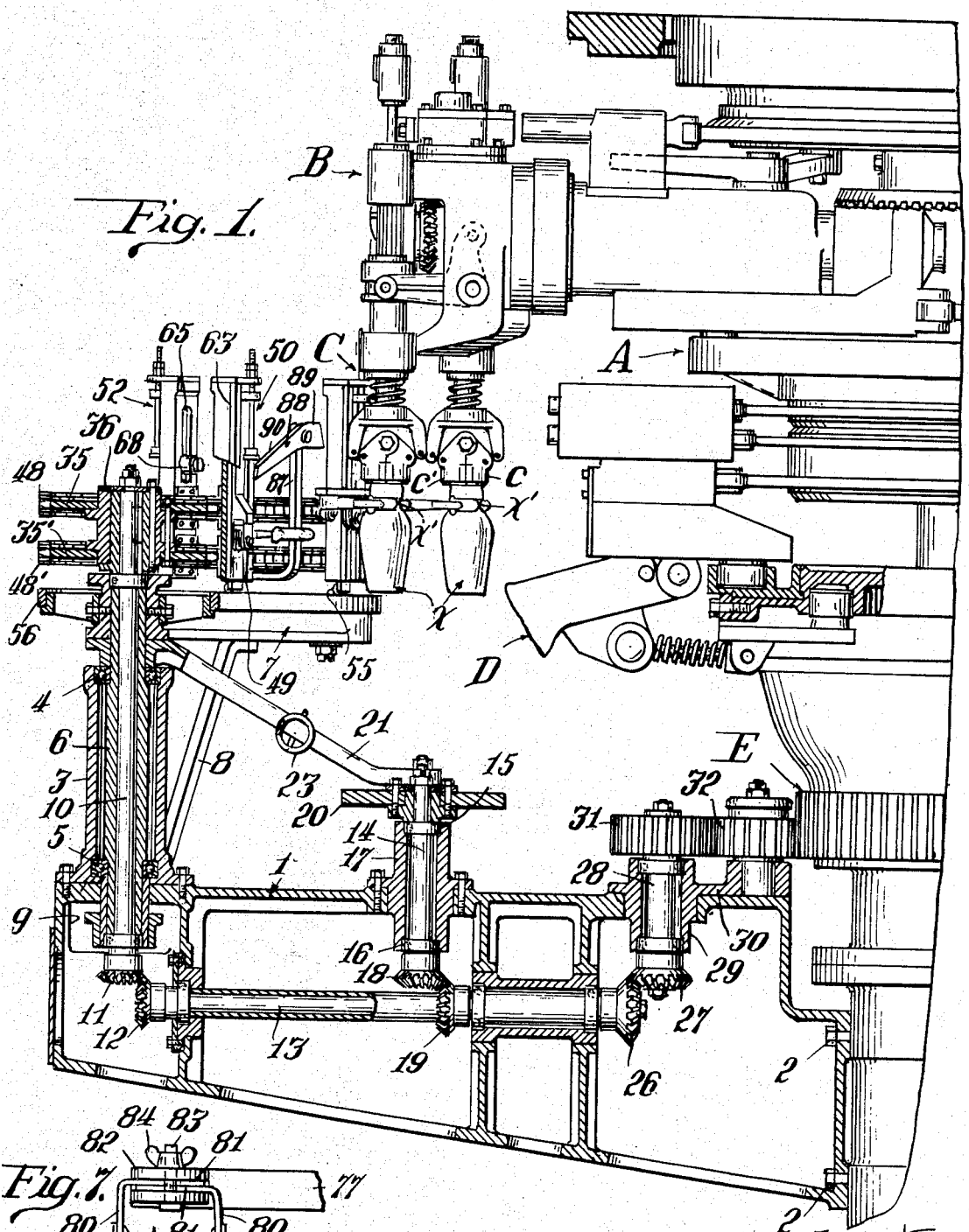

Oct. 19, 1937. H. R. SCHUTZ 2,096,264
TAKE-OUT DEVICE
Filed Feb. 21, 1936   3 Sheets-Sheet 3
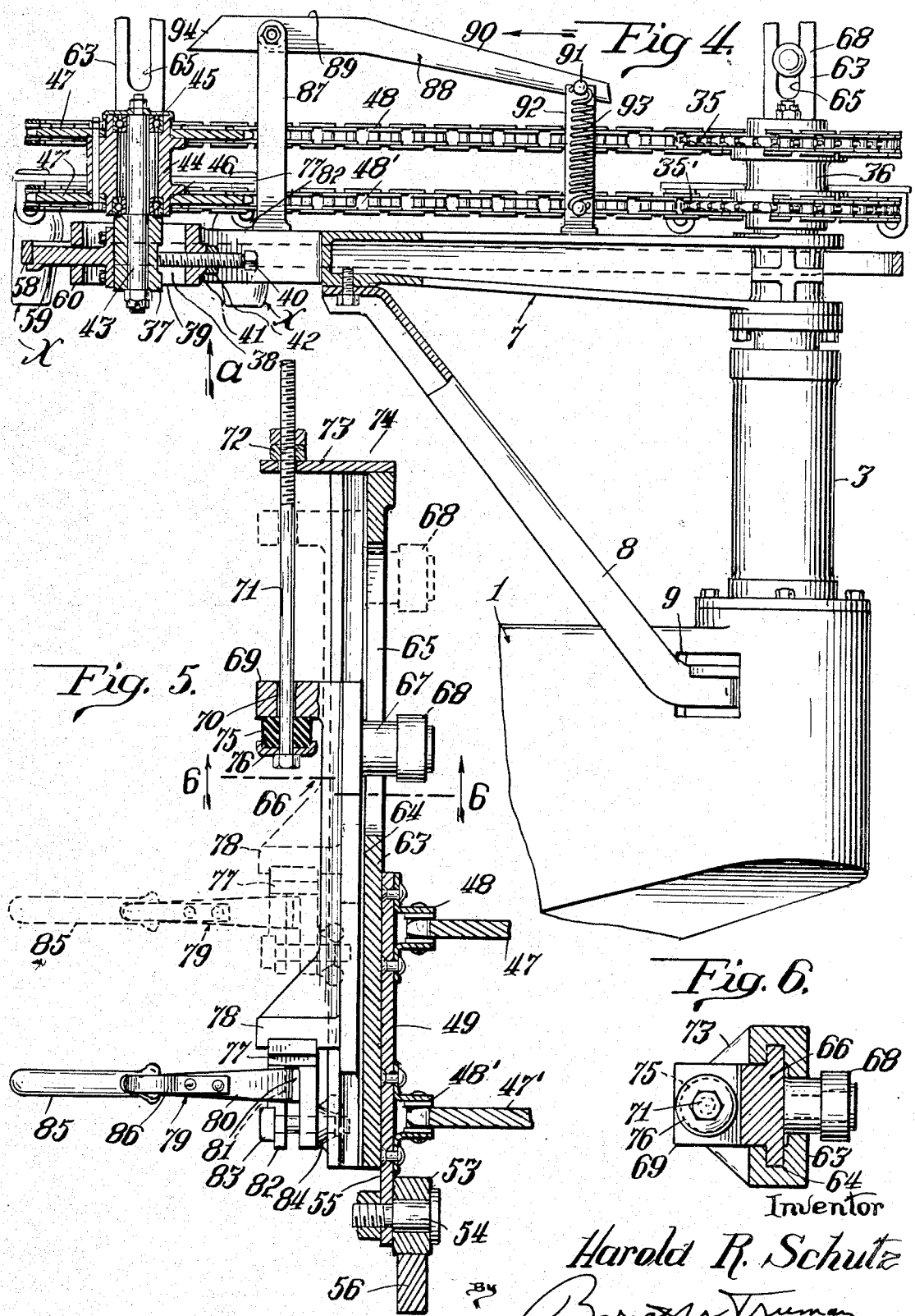
Inventor
Harold R. Schutz
By Barnett & Truman
Attorneys.

Patented Oct. 19, 1937

2,096,264

UNITED STATES PATENT OFFICE 2,096,264

TAKE-OUT DEVICE

Harold R. Schutz, Ottawa Hills, Ohio, assignor to Libbey Glass Company, Toledo, Ohio, a corporation of Ohio Application February 21, 1936, Serial No. 65,045

15 Claims. (Cl. 214—1)

This invention relates to certain new and useful improvements in a take-out device, more particularly a device adapted to receive, support and transport to a new position finished glass articles as delivered from a glass-working machine of the rotary turret type. It will, however, be apparent as the disclosure proceeds that this take-out device is adapted for use with other machines or other articles than those herein disclosed by way of example.

In a glass-working machine of the type with which this take-out device is especially designed to cooperate, the glass articles, when completed, are suspended by upper neck portions from glass-working spindles which move continuously with the machine through a circular path of travel. When these finished glass articles are released by the spindles they drop onto a chute or deflector which directs them onto a conveyor or into a receiver, or the articles may be individually grasped by suitable tongs before they are released and then carried away. The present take-out device relates to an improved means for receiving and disposing of these completed glass articles. Briefly described, this device comprises a continuously moving looped conveyor which is mounted adjacent the glass-working machine and is bodily movable toward and from the machine so that article-carriers mounted on the conveyor may be moved into engagement with the glass articles before they are released by the supporting spindle. When so positioned, the adjacent run of the conveyor moves synchronously with the articles as carried by the machine. When the articles are released by the spindles, they are supported by the carriers and the conveyor moves away from the machine and the article carriers move to a location at which the glass articles are removed from the conveyor or otherwise disposed of.

The principal object of this invention is to provide an improved take-out device of the type briefly described hereinabove and disclosed more in detail in the specifications which follow.

Another object is to provide a take-out device that is driven from the glass-working machine and adapted to move, at times, in synchronism therewith.

Another object is to provide a take-out device embodying article-carriers or receivers that may travel vertically with the glass articles when released by the spindles.

Another object is to provide improved means for adjusting and supporting the conveyor-chains and the article-carriers supported thereby.

Other objects and advantages of this invention will be more apparent from the following detailed description of one approved form of apparatus constructed and operating according to the principles of this invention.

In the accompanying drawings:

Fig. 1 is an elevation, partially in vertical section, showing one side portion of the glass-working machine and the improved take-out device.

Fig. 2 is a plan view of the take-out device and the driving connection therefor.

Fig. 3 is a partial inverted plan view, on a larger scale, looking substantially in the direction of the arrow $a$ in Fig. 4.

Fig. 4 is a vertical section through a portion of the mechanism, the view being taken substantially on the line 4—4 of Fig. 2.

Fig. 5 is a vertical section through one of the article carriers and the supporting means therefor, the view being taken substantially on the line 5—5 of Fig. 2.

Fig. 6 is a detail horizontal section taken substantially on the line 6—6 of Fig. 5.

Fig. 7 is an inverted plan view of one of the article-carrying yokes.

At the right of Fig. 1 is shown a portion of a glass-working machine of well known type, this machine comprising a turret structure indicated generally at A which rotates rather slowly (in a clockwise direction, as seen from above in this figure) about a central verical axis, which would be located considerably to the right of the sheet. Spaced at equal intervals about the periphery of this turret are glass-working heads B, each comprising a pair of similar spindles C. In a machine of the type here shown by way of example there are twelve heads B and twenty-four spindles C. It will be understood that each spindle C performs a similar operation and there are two spindles on each head, merely for the purpose of doubling the output of the machine. Each spindle comprises a pair of clamping jaws $c$ and $c'$ which may be moved toward and from one another in order to grip a portion of a glass blank and release the glass article when finished. At the start of a glass-working operation, the spindles C are inverted from the position shown in Fig. 1 and glass blanks are received at the upper ends and clamped in place by the jaws $c$ and $c'$. As the head B moves around through its continuous path of travel, the spindles and the glass blanks carried thereby are inverted so that the blanks hang downwardly. The spindles are rotated and air is forced through the spindles into the blanks so that the blanks are expanded to form, first in the open air and then within molds D which are moved into position about the glass blanks or parisons. After the glass blanks are blown to final shape, the molds D are opened and withdrawn to the position shown in Fig. 2, and the finished glass articles x are then suspended by spindles C which still grip an upper neck portion of the article. The spindles and glass articles suspended therefrom have now reached the position shown in Fig. 1. Shortly thereafter the spindle jaws c and c' are separated to release the glass article x. Due to the construction of the spindles C, the jaws c and c' and the articles suspended thereby are lowered somewhat incidental to this separating or releasing operation, and it will also be apparent that the glass article x must fall or move downwardly a certain distance in order to have its neck portion released from the jaws. It will thus be apparent that a limited vertical movement of the glass articles must be allowed for after these articles have been engaged by the carriers hereinafter described.

It has been customary heretofore to have the glass articles x drop onto a chute or deflector which directs them from the machine. This operation is apt to break or deform the articles. The improved take-out device which forms the particular subject matter of this invention is adapted to grasp the articles before they are released from the glass-working spindles C and then carry these articles to a position away from the machine where they are finally disposed of.

The improved take-out device comprises a supporting frame 1 which is fixedly mounted, as indicated for example at 2, on some portion of the fixed supporting frame of the glass-working machine. A tubular supporting bracket 3 mounted on the outer portion of frame 1 carries the roller bearings 4 and 5 in which is mounted the vertically extending tubular member 6 of a swinging frame, which frame also comprises the horizontally extending beam 7 secured to the upper end portion of tubular member 6, and the diagonal supporting member 8 which is secured at its upper end to an outer portion of beam 7 and at its lower end to the lower end portion of tubular member 6. The lower end portion of member 8 extends through a slot or opening 9 in the supporting frame 1. A vertical drive shaft 10 is mounted for rotation in frame member 6 about the vertical axis of swinging movement of the frame. Shaft 10 is driven through bevel gears 11 and 12 from the outer end of a horizontal shaft 13 journaled in frame 1. A second short vertical shaft 14 is journaled in bearings 15 and 16 in a tubular bracket 17 mounted on frame 1. The lower end of shaft 14 is driven through bevel gears 18 and 19 from the horizontal shaft 13. The upper end of shaft 14 carries a cam 20. A downwardly sloping arm 21 is secured at its upper end to the tubular member 6 of the swinging frame, and carries at its lower end a roller 22 positioned to bear against the cam 20. A spring 23 connected between arm 21 and a portion of the fixed supporting frame 1 tends to constantly swing the arm 21 and the swinging frame in such a direction as to hold roller 22 against the cam 20. When roller 22 is engaged by the high portion 24 of cam 20, the swinging frame and the conveyor mechanism carried thereby (as hereinafter described) will be swung away from the glass-working machine. When roller 22 moves onto the low portion 25 of cam 20, the spring 23 will swing the frame and conveyor mechanism toward the glass-working machine.

The horizontal shaft 13 is driven through bevel gears 26 and 27 from a short vertical shaft 28 journaled in the hub portion 29 of a supporting plate 30 adjustably mounted on the frame 1. A spur gear 31 secured on the upper end of shaft 28 is driven, through idler gear 32, from the large annular gear E mounted on the rotary turret A of the glass-working machine. It will now be apparent that when the glass-working machine is in operation, the drive shaft 10 and cam 20 of the take-out mechanism will be driven in synchronism therewith, through the chain of gearing hereinabove described.

The idler gear 32 is mounted for rotation on the supporting plate 30. Bolts 33 which extend through slots 34 in plate 30 adjustably secure this plate in position on the fixed frame 1. By loosening the bolts 33 and swinging plate 30 to one side, the idler 32 may be moved out of mesh with gear E so as to permit the glass-working machine to rotate without driving the take-out mechanism.

A pair of similar sprockets 35 and 35' are mounted on a hub 36 which is secured on the upper end portion of drive shaft 10. A supporting block 37, (see Figs. 3 and 4) is slidable in guideways 38 in the forked outer end portion 39 of beam 7. The block 37 may be adjusted toward or away from the axis of drive shaft 10 by means of screw 40 threaded in a cross member 41 of beam 7 and locked in place by nut 42. A short vertical stub-shaft 43 mounted in block 37 extends upwardly and a hub 44 rotatable on this shaft by means of bearings 45 and 46 supports a pair of sprocket wheels 47 and 47' which are similar to the driving sprockets 35 and 35' already described. The traveling conveyor mechanism comprises a sprocket chain 48 looped about the upper pair of sprockets 35 and 47, and a similar chain 48' looped about the other pair of sprockets 35' and 47'. These chains 48 and 48' are tied together at spaced intervals by the vertically extending plates 49 which support the article carriers. In the present example there are three of these article carrying units spaced at equal distances throughout the length of the chain loops, and indicated at 50, 51 and 52 respectively in Fig. 2. It will be understood that the number of these article carrying units will vary in accordance with the length of the conveyor, these units being so spaced apart as to cooperate successively with the different pairs of spindles C of the glass-working machine as these spindles successively revolve into position adjacent the take-out mechanism.

A roller 53 is mounted on the pivot pin 54 secured in the lower end portion 55 of each supporting plate 49, this roller traveling on a looped track 56 positioned beneath the conveyor chain. This supporting roller prevents sagging of the chains and supports the greater part of the weight of the article carrier and the load supported thereby. The two side runs and one looped end of the trackway 56 are permanently supported from the frame beam 7 by means of the outwardly projecting side arms 57 (Fig. 3) but the outer end loop 58 of the trackway is supported by an arm 59 projecting from the adjustable block 37, already described, and guided in the cross bar 60 secured to the ends of the yoke arms 39. The end portions of the track loop 58 have lapped joints 61 and 62 with the respective ends of the side runs of the trackway. It will now be seen that by adjusting the position of the block 37, the end sprockets 47 and 47' may be moved to tighten or adjust the conveyor chains 48 and 48' and at the same time the effective length of the trackway 56 will be adjusted to conform to the position of the chains.

Each article carrying unit comprises a supporting frame or guide 63 which is secured to the supporting plate 49 and projects upwardly a considerable distance above the plate and conveyor chains. This guide frame is formed throughout its length with a vertically extending slide-way 64, and in the upper portion with a slot 65 extending through the back of the frame. A carriage, indicated generally at 66, is shaped to fit slidably within the slide-way 64 in which it is supported and guided for vertical movement. The carriage has a rearwardly projecting boss 67 which extends through slot 65 and carries a roller 68. A forwardly projecting arm 69 at the upper end of carriage 66 is formed with an opening 70 through which projects the threaded rod 71 adjustably supported by nut 72 from a plate 73 secured at 74 to the upper end of frame 63. A resilient bumper 75 is supported by head 76 at the lower end of rod 71, and when the carriage 66 falls or moves to the lower end of its permitted path of travel (as shown in solid lines in Fig. 5) the arm 69 will engage bumper 75 and thereby support the carriage and the glass articles carried thereby from the rod 71. A horizontally extending cross bar 77 is carried by the lower end 73 of the carriage, this bar supporting at each end one of the yoked article-supporting members indicated generally at 79. Each of these yoked members comprises a pair of similar side arms 80 each provided with a right angled extension 81 at its rear end, these portions 81 being overlapped and clamped between the arms of a downwardly extending fork 82 by means of bolt 83 and thumbnut 84. By this means the width of the yoke or the spacing between the forwardly projecting arms 80 may be adjusted as found desirable in order to accommodate different sizes of glass articles. A pair of porcelain fingers 85 are replaceably secured on the outer ends of the yoke arms 80 by means of the spring clips 86. The fingers 85 of the yoke are adapted to be projected into the sides of a groove $x'$ which is formed near the upper end of the glass article $x$ and thereby supports the article. (See Fig. 1.) The crossbar 77 is of such length that the two yoked members will be suitably spaced apart to simultaneously engage the two glass articles $x$ (suspended from a pair of spindles C).

A post 87 projecting upwardly from a portion of the supporting frame 7 pivotally carries the cam bar 88 which comprises a normally horizontally extending portion 89 and a downwardly sloping portion 90. The portion 90 is supported near its lower end by a pin 91 which normally rests on a second supporting post 92 and is held down by spring 93. This cam bar is so positioned as to be engaged by the roller 68 on the rear of carriage 66. The carriages move in the direction of the arrows, Figs. 2 and 4, and normally, or through the greater portion of their looped path of travel, the carriages are in the lower position, as shown in solid lines in Fig. 5. When so positioned, the roller 68 is such a height that it will just run onto the lower end 90 of cam bar 88 and as the carriage moves forwardly the roller will move up the cam bar until it is supported on the upper horizontal run 89 of the cam, at which time the carriage will be in the elevated position shown in dotted lines in Fig. 5. As the roller 68 passes beyond the forward end 94 of the cam bar, the carriage is again free to drop to its lower position with the arm 69 resting on bumper 75.

If by any chance the direction of travel of the conveyor should become reversed, it will be apparent that the roller 68 would engage beneath the cam bar 88. If this should occur the spring 93 will yield and permit the roller 68 to lift the cam bar 88 upwardly so that the carriage can pass without breaking any parts. Aside from this safety feature the cam bar normally remains in the fixed position shown in Fig. 4.

Referring now to the general operation of this device, it will be understood that the spindles C and the articles $x$ suspended therefrom move continuously through the arc of travel indicated at T in Fig. 2, in a clockwise direction, and at the same time the article carriers 50, 51 and 52 are moving in the direction of the arrows through their looped orbit. As a pair of the suspended articles $x$ are moving toward the position indicated at 50, the roller 22 is on the high portion of cam 20 and the entire conveyor unit is swung out to the dotted line position in Fig. 2, and one of the carriers, such as 50, is being lifted to its elevated position by the engagement of its roller 68 with the cam bar 88. While the carrier is held in this elevated position by the roller 68 resting on the upper horizontal run 89 of the cam bar, the roller 22 runs off onto the lower portion 25 of cam 20 and the conveyor is swung toward the glass-working machine so as to bring the pair of yoked members 79 into engagement with the grooved necks $x'$ of the glass articles $x$. It will be understood that at this time the glass articles and the article carrier are moving forward at the same speed and in substantially the same path. Directly after the yoked members 79 are engaged about the glass articles, the roller 68 runs off of cam bar 88 and the carriage 66 is now momentarily suspended from the glass articles. Immediately thereafter the spindle jaws $c$ and $c'$ open and release the glass articles, and the articles and the carriage 66 fall downwardly until stopped by the engagement of arm 69 with the bumper 75. From this time on the articles are supported from the carriage. The cam roller 22 now runs onto the high portion 24 of cam 20 and the entire conveyor is now swung out to the position shown in dotted lines in Fig. 2 and remains there until another pair of spindles have moved into position, at which time this cycle of operation is repeated by the next following article-carrying unit 51. The first unit 50 with the glass articles carried thereby has now moved around onto the outer run of the conveyor and the glass articles are removed by an attendant or otherwise disposed of.

I claim:

1. A take-out device adapted to receive a formed glass article from a glass working machine which suspends and moves the glass article through a path of travel and releases the article at a predetermined position in this path, said take-out device comprising an endless conveyor consisting of two end loops and the connecting side runs, a portion of one of these runs moving adjacent the path of travel of the glass article when suspended by the machine, means for driving the conveyor, a yoke mounted on the conveyor and adapted for engagement with the glass article, and means for bodily moving a portion of the conveyor comprising one looped end and the last-mentioned run laterally toward the machine when the yoke is moving through this run adjacent to but out of engagement with a glass article so that the yoke will be shifted laterally into engagement with the article prior to its release from the machine and will thereafter support the article.

2. A take-out device adapted to receive a formed glass article from a glass-working machine which suspends and moves the glass article through a path of travel and releases the article at a predetermined point in the path of travel, said take-out device comprising a yoke adapted to be engaged about the glass article, a looped conveyor on which the yoke is mounted, means for driving the conveyor, the conveyor being pivotally mounted adjacent one end thereof, and means for swinging the other end portion of the conveyor so that the yoke will be brought into engagement with the glass article and will travel therewith prior to the release of the article from the machine, and will support and transport the article after its release.

3. A take-out device adapted to receive a formed glass article from a glass-working machine which suspends and moves the glass article through a path of travel and releases the article at a predetermined point in the path of travel, said take-out device comprising a yoke adapted to be engaged about the glass article, a looped conveyor on which the yoke is mounted, means for driving the conveyor, the conveyor being pivotally mounted adjacent one end thereof, means comprising a rotary cam for swinging the other end portion of the conveyor so that the yoke will be brought into engagement with the glass article and will travel therewith prior to the release of the glass article from the machine and will support and transport the article after its release, and means synchronized with the machine for moving the conveyor and rotating the cam.

4. A take-out device adapted to receive a formed glass article from a glass-working machine which suspends and moves the glass article through a path of travel and releases the article at a predetermined point in the path of travel, said take-out device comprising a yoke adapted to be engaged about the glass article, a looped conveyor, means for driving the conveyor, a supporting guideway carried by the conveyor, the yoke being vertically movable in this guideway, means for supporting and bodily moving the conveyor toward and from the machine so as to bring the yoke into and out of position to engage a glass article, and a fixed cam on the last mentioned supporting means adapted to be engaged by and elevate the yoke prior to its engagement with the article, the yoke and the article supported thereby dropping to a lower position after the article is released by the glass-working machine.

5. A take-out device adapted to receive a formed glass article from a glass-working machine which suspends and moves the glass article through a path of travel and releases the article at a predetermined point in the path of travel, said take-out device comprising a holding member adapted to engage the glass article, means to support and move the holding member adjacent to and timed with the suspended article, means to elevate the holding member above its normal position, and means to move the elevated holding member laterally into engagement with the article so that it may return with the article to its normal lowered position when the article is released by the machine.

6. A take-out device adapted to receive a formed glass article from a glass-working machine which suspends and moves the glass article through a path of travel and releases the article at a predetermined point in the path of travel, said take-out device comprising a yoke adapted to be engaged about the glass article, a conveyor on which the yoke is mounted, means for moving the conveyor so that the yoke will move through an endless path of travel and will move with the glass article during a portion of this path of travel, means for moving the conveyor in a direction transverse to the last mentioned movement so that the yoke will also move into and out of position to engage the article as the yoke is moving with the article, and means for moving the yoke upwardly prior to its engagement with the article and then permitting it to return to its normal lower position on the conveyor as the article is released from the suspending member.

7. A take-out device adapted to receive a formed glass article from a glass-working machine which suspends and moves the glass article through a path of travel and releases the article at a predetermined point in the path of travel, said take-out device comprising a yoke adapted to be engaged about the glass article, a carriage supporting the yoke, a looped conveyor, means for driving the conveyor, a supporting guideway carried by the conveyor, the carriage being vertically movable in the guideway, a roller on the carriage, means for supporting and bodily moving the conveyor toward and from the machine to bring the yoke into and out of position to engage a glass article, and a cam bar mounted on the last mentioned supporting means adjacent the path of travel of the conveyor, the cam bar having an upwardly slanting stretch on which the roller runs to elevate the yoke, and an upper horizontal stretch for supporting the roller and yoke while the yoke is moved into engagement with the article.

8. A take-out device adapted to receive a formed glass article from a glass-working machine which suspends and moves the glass article through a path of travel and releases the article at a predetermined point in the path of travel, said take-out device comprising a yoke adapted to be engaged about the glass article, a carriage supporting the yoke, a looped conveyor, means for driving the conveyor, a supporting guideway carried by the conveyor, the carriage being vertically movable in the guideway, a roller on the carriage, means for supporting and bodily moving the conveyor toward and from the machine to bring the yoke into and out of position to engage a glass article, and a cam bar mounted on the last mentioned supporting means adjacent the path of travel of the conveyor, the cam bar having an upwardly slanting stretch on which the roller runs to elevate the yoke, and an upper horizontal stretch for supporting the roller and yoke while the yoke is moved into engagement with the article, the cam bar being pivotally supported adjacent its upper end, a support for the lower end of the bar, and means for yieldingly holding the bar down on this last mentioned support.

9. In a take-out device, a supporting frame, a vertical drive-shaft pivoted in the frame, a driving sprocket secured on the shaft, a second sprocket rotatably supported on the frame at a location spaced from the driving sprocket, an endless conveyor chain carried by the sprockets, a supporting member mounted on the chain and provided with a vertically extending guideway, an article carrier mounted in the guideway for limited vertical movement, a lifting roller on the article carrier, and a cam mounted on the frame in position to be engaged by the roller to lift the article carrier at a predetermined location in the path of travel of the conveyor.

10. In a take-out device, a supporting frame, a vertical drive-shaft pivoted in the frame, a driving sprocket secured on the shaft, a second sprocket rotatably supported on the frame at a location spaced from the driving sprocket, an endless conveyor chain carried by the sprockets, a supporting guideway mounted on the chain, an article carrier mounted in the guideway for limited vertical movement, a lifting roller on the article carrier, and a cam mounted on the frame in position to be engaged by the roller to lift the article carrier at a predetermined location in the path of travel of the conveyor, said cam comprising a bar pivotally supported adjacent its upper end, a fixed support on which the lower end of the bar normally rests, and a spring for yieldingly holding the bar down on the fixed support, the roller normally engaging and being lifted by the upper surface of the bar, the bar being capable of swinging up in opposition to the spring to permit a return movement of the roller beneath the bar.

11. A take-out device comprising a fixed support, a swinging frame pivoted adjacent one end in the support about a vertical axis, a vertical drive shaft pivoted on this vertical axis, a driving sprocket secured on the shaft, a supporting block movably mounted in the free end portion of the swinging frame, means for adjusting the block toward or from the shaft, a vertical stub-shaft mounted in the block, a second sprocket rotatably mounted on the stub-shaft, an endless conveyor chain carried by the sprockets, an article carrier, a supporting means therefor secured to the conveyor chain, a roller on the lower end of the supporting means, and an endless trackway on which the roller travels, said trackway comprising a main portion mounted on the swinging frame and an end loop extensibly connected with the main portion and carried by the adjustable block, and means for swinging the frame about its vertical axis.

12. A take-out device comprising a fixed support, a swinging frame pivoted adjacent one end in the support about a vertical axis, a vertical drive shaft pivoted on this vertical axis, a driving sprocket secured on the shaft, a second sprocket, means for rotatably supporting the second sprocket adjacent the free end of the swinging frame, an endless conveyor chain carried by the sprockets, an article carrier, a supporting means therefor secured to the chain, an arm on said swinging frame, means for urging the arm in one direction and a rotary cam adapted to periodically swing the arm in the other direction, and means for rotating the cam and drive shaft at predetermined relative speeds.

13. A take-out device comprising a fixed support, a swinging frame pivoted at one end in the support about a vertical axis, a vertical drive shaft pivoted on this vertical axis, a driving sprocket secured on this shaft, a second sprocket, means for rotatably supporting this second sprocket adjacent the free end of the swinging frame, an endless conveyor chain carried by the sprockets, a supporting guideway mounted on the chain, an article carrier mounted in the guideway for limited vertical movement, means on the frame for elevating the article carrier at one location in its path of travel with the conveyor, and means so timed as to swing the frame laterally when the article carrier is elevated.

14. A take-out device comprising a fixed support, a swinging frame pivoted at one end in the support about a vertical axis, a vertical drive shaft pivoted on this vertical axis, a driving sprocket secured on this shaft, a second sprocket, means for rotatably supporting this second sprocket adjacent the free end of the swinging frame, an endless conveyor chain carried by the sprockets, a supporting guideway mounted on the chain, an article carrier mounted in the guideway for limited vertical movement, a lifting roller on the article carrier, a cam mounted on the frame adjacent the path of travel of the carrier in position to be engaged by the roller to lift the article carrier, and means timed to swing the frame laterally at the time the article carrier is elevated.

15. A take-out device comprising a fixed support, a swinging frame pivoted at one end in the support about a vertical axis, a vertical drive shaft pivoted on this vertical axis, a driving sprocket secured on this shaft, a second sprocket, means for rotatably supporting this second sprocket adjacent the free end of the swinging frame, an endless conveyor chain carried by the sprockets, a supporting guideway mounted on the chain, an article carrier mounted in the guideway for limited vertical movement, a lifting roller on the article carrier, a cam mounted on the frame adjacent the path of travel of the carrier in position to be engaged by the roller to lift the article carrier, an arm on the frame, means for urging the arm and frame in one direction, a rotary cam engaging the arm to periodically swing the frame in the other direction, and means for rotating the cam so timed that the frame will be swung in one direction when the carrier is elevated.

HAROLD R. SCHUTZ.